United States Patent [19]

Katayama et al.

[11] Patent Number: 4,716,558
[45] Date of Patent: Dec. 29, 1987

[54] RECORD DISC ADDRESSING APPARATUS

[75] Inventors: Yoshitaka Katayama, Yokohama; Daiki Nabeshima, Kamakura; Shinichi Nakamura, Kawasaki, all of Japan

[73] Assignee: Tokyo Shibaura Denki Kabushiki Kaisha, Kawasaki, Japan

[21] Appl. No.: 565,458

[22] Filed: Dec. 27, 1983

[30] Foreign Application Priority Data

Dec. 27, 1982 [JP] Japan ................................. 57-234035

[51] Int. Cl.$^4$ ............................................... G11B 7/00
[52] U.S. Cl. ......................................... 369/33; 369/43; 360/72.2
[58] Field of Search ................. 360/69, 72.1, 72.2, 360/74.1, 75, 78; 369/43, 27, 30, 32, 33, 47; 358/342

[56] References Cited

U.S. PATENT DOCUMENTS 4,199,820  4/1980  Ohtake et al. ...................... 365/234
4,321,635  3/1982  Tsuyuguchi ....................... 369/28 X

FOREIGN PATENT DOCUMENTS

| 0007199 | 1/1980 | European Pat. Off. . |
| 0078060 | 5/1983 | European Pat. Off. . |
| 0092169 | 10/1983 | European Pat. Off. . |
| 2718092 | 11/1977 | Fed. Rep. of Germany . |
| 8303584 | 9/1983 | France . |
| 2056118 | 3/1981 | United Kingdom . |

*Primary Examiner*—Robert L. Richardson
*Attorney, Agent, or Firm*—Finnegan, Henderson Farabow, Garrett & Dunner

[57] ABSTRACT

A record disc reproducing apparatus determines the magnitude and polarity of the difference between a preselected data address and a current data address and moves a pickup assembly in a direction to reduce that difference until it drops below a prescribed address tolerance. The amount of movement can either be a given distance or some fraction either of the difference between the current and prescribed data addresses, or of the breadth of a program portion.

9 Claims, 7 Drawing Figures

RECORD DISC ADDRESSING APPARATUS

FIELD OF THE INVENTION

This invention relates to a record disc reproducing apparatus, and more particularly, to a digital audio disc player which is able to quickly access a desired address recorded on a disc.

BACKGROUND OF THE INVENTION

There have recently been developed digital record discs for recording data signals such as audio signals or image signals and record disc reproducing apparatus for reproducing the recorded data. A digital record disc stores digital data intended for high density recording in the form of a spiral bit string on one side of the disc and reproduced through reading the bit string by means of an optical pickup using laser beams. Moreover, the record disc reproducing apparatus is used to read the recorded data by causing the optical pickup to follow the bit string recorded on the digital record disc by a tracking control system and to process the read-out signal in a predetermined manner to convert the signal into the original analogue signal for example, an audio or video signal as an output.

As is well known, the digital data and address data indicating the address of the digital data is written to the program area of the digital record disc. For instance, in a CD (compact disc) type digital record disc (hereinafter called simply a disc), digital data such as audio signals in a digital form and their digital data track numbers, indexes and addresses, and address data indicating absolute time after the reproduction of the disc is started, are recorded.

A record disc reproducing apparatus for the CD type disc is provided with high speed movement of the pickup by performing fast-forward or fast-reverse of the pickup to select and reproduce a desired digital data, and an address search function to perform the automatic search for the desired address data within the enormous amount of data on the disc.

When the fast-forward or fast-reverse operation button or key has been operated, the pickup is correspondingly moved in an outward or inward radial direction of the disc at high speed by a pickup carriage motor. When the search operation button or key has been operated with the prior designation or presetting of the desired address of the program recorded on the disc, the high speed pickup is automatically moved until the desired address is read out.

To ensure that the search function can be quickly made by designating only the track number and the index on the disc, Table of Contents data (hereinafter called TOC data) indicating the digital data on the starting addresses (that is, absolute time) of the digital data to which each of the track numbers is allotted, are recorded in the read-in area thereof. In other words, the record disc reproducing apparatus stores the TOC data in the lead-in area and the search function is carried out by automatically referring to the starting address corresponding to the track number designated. As a result, the digital data can readily be reproduced with ease.

As for the digital data recorded on the CD type disc, a prescribed number of frames constitutes one data block, and are accompanied by prescribed units of subcodes in addition to the data converted from audio signals in the form of pulse code modulation (PCM).

Figure 1:
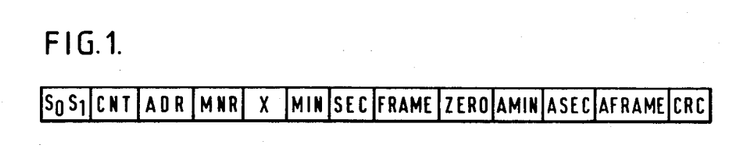
FIG. 1 is a diagram illustrating the format of a subcode Q being recorded on a disc.

Among them, a subcode Q is address data for the recorded data and has a format shown in FIG. 1.

One unit of the subcode Q reproduced in the program area is, as shown, formed with the data reproduced in the order of the following items:

(1) $S_0$, $S_1$: 2 bits synchronous pattern data section indicating the start of the subcode Q;

(2) CNT: 4 bits control data section distinguishing between two channel program and four channel program, and indicating a presence or an absence of preemphasis and a permission or a prohibition of copying;
0 0 x 0: 2 ch., emphasis OFF
1 0 x 0: 4 ch., emphasis ON
0 0 x 1: 2 ch., emphasis OFF
1 0 x 1: 4 ch., emphasis ON
x x 0 x: prohibition of copying
x x 1 x: permission of copying (3) ADR: 4 bits mode data section indicating the data
Mode 1 (BCD 1): Address Mode
Mode 2 (BCD 2): Disc Catalogue Number Mode
Mode 3 (BDC 3): Special Information Mode (4) MNR: 8 bits (2 figures in BDC) program number index data section;

(5) X: 8 bits sub-index data section of the program;

(6) MIN: 8 bits first "minute" data section indicating the order of "minute" within the time elapsed since the reproduction of the prescribed program number was commenced (hereinafter referred to as relative time);

(7) SEC: 8 bits first "second" data section indicating the order of "second" within the relative time;

(8) FRAME: 8 bits first decimal place of "second" data section indicating the order of decimal of "second", dividing one "second" with prescribed digit number, e.g. 75, within the relative time;

(9) ZERO: Section composed of 8 bits representing digital 0;

(10) AMIN: 8 bits second "minute" data section indicating the order of minutes within the time elapsed since the reproduction was started from the read-in area (hereinafter referred to as absolute time), which represents the location or the address of the prescribed data;

(11) ASEC: 8 bits second "second" data section indicating the order of seconds within the absolute time;

(12) AFRAME: 8 bits second decimal place of "second" data section indicating the order of decimal place of "second", dividing one "second" with the prescribed digit number, e.g. 75, within the absolute time; and (13) CRC: 16 bits error check code data section for the subcode Q.

The subcode Q formed with the above format is extracted by the record disc reproducing apparatus and not only the state in which each data (for instance, (MNR), (X), (MIN), (SEC)) is reproduced but also the mode in which the pickup is fast carried are displayed by the display unit of the record disc reproducing apparatus, so that the desired address can readily be attained.

For the search function to be carried out as quickly as possible, the pickup must move more quickly than the fast-forward or fast-reverse operation function are accomplished in the radial direction of the disc; however, in conventional apparatus, the address data on the disc becomes unreadable during such high speed pickup movement, and the search function cannot be carried out.

To avoid this problem, a record disc reproducing apparatus capable of making a search at a higher speed has been constructed so that address data is made to stop for a prescribed period of time during which the data is readable after the pickup is moved a prescribed distance at a speed higher than the fast-forward or fast-reverse operation modes, and this operation is repeated until the desired address is attained.

With the above arrangement, an address of a track where the pickup is located is read out each time the pickup is moved thereon at high speed during the search. The reading out time of addresses is unnecessarily wasted when an address to be reached is far from the address of the track corresponding to the position of the pickup (hereinafter referred to as the reproduction address).

Moreover, when dust or a crack on the disc makes the address data unreadable, the record disc reproducing apparatus keeps attempting to read address data until all the address data is read out. This means that extra time is required before the completion of the search.

SUMMARY OF THE INVENTION

An object of the present invention is to provide an excellent record disc reproducing apparatus with improved operability to make a search at a desired high speed.

This and other objects of the present invention are achieved in the record disc reproducing apparatus of the invention for use in reproducing data stored thereon, which comprises a pickup assembly for reading data from the disc and movable in a radial direction with respect to the disc, a motor for moving the pickup assembly, a control circuit for controlling the motor, a memory for storing the address location of preselected data and a prescribed value (A), and processing means for comparing the address of data read from the disc (Ap) with the address of the preselected data (As) and providing instructions through the control circuit to cause the pickup assembly to move a given distance as long as $|Ap-As| > A$ and halving the distance moved while reversing direction of movement each time the location of As is passed until Ap=As within a range plus or minus the prescribed value.

Additional objects, advantages, and features of the present invention will become apparent to persons skilled in the art from a study of the following description and of the accompanying drawings, in which:

DESCRIPTION OF THE PREFERRED EMBODIMENT

The present invention will now be described in detail with reference to FIGS. 2 to 7. Throughout the drawings, like reference numerals or letters are used to designate like or equivalent elements.

Figure 2:
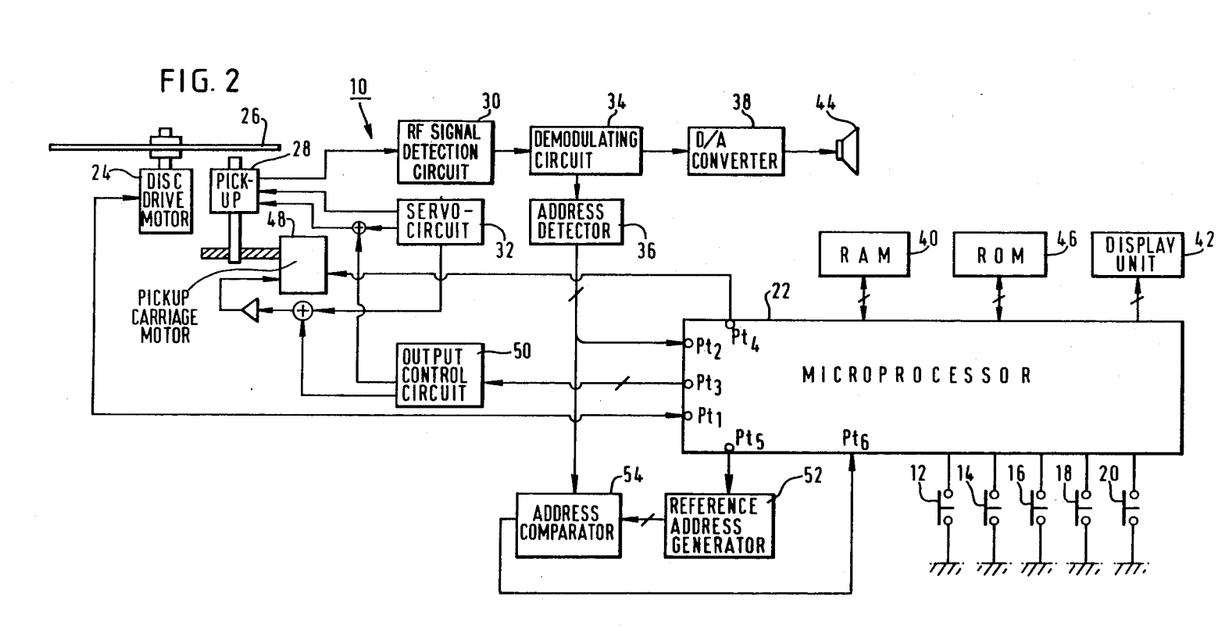
FIG. 2 is a circuit block diagram illustrating an embodiment of the record disc reproducing apparatus in accordance with the present invention.

Referring first to FIG. 2, the fundamental circuit block arrangement of a record disc reproducing apparatus embodying the present invention will be described. A record disc reproducing system 10 is controlled by operating switches 12, 14, 16, 18 and 20 as respective operation keys for playback operation, stop operation, fast-forward operation, fast-reverse operation and search operation through microprocessor 22 which is connected to the switches through an interface circuit (not shown).

When the microprocessor 22 operates to drive disc drive motor 24 connected to an output port $Pt_1$ thereof, digital data stored in a disc 26 is reproduced as an RF signal by a pickup 28. The reproduced RF signal is sent to an RF signal detection circuit 30. The RF signal detection circuit 30 separates a pickup servo signal to be supplied to a servo-circuit 32 from the data signal to be supplied to demodulating circuit 34. The servo-circuit 32 sends various signals to the pickup 28 for servo control purposes, including focusing and tracking control.

The demodulating circuit 34 separates an address signal component for detecting the address data from the reproduced RF signal and supplies the address signal component to an address detector 36. The demodulating circuit 34 generates a demodulated signal (EFM signal) and supplies the signal to a digital to analog (D/A) converter 38.

The address data detected from the address detector 36 is applied to an input port $Pt_2$ of the microprocessor 22. If the address data is the aforementioned TOC data read from disc 26 during the reproduction of the lead-in area of the disc 26, the microprocessor 22 stores the TOC data into a random access memory (RAM) 40 so that the TOC data is used to perform the control function necessary for making a search operation. If the address data detected from the address detector 36 is the data read from the disc 26 during the reproduction of the program area of the disc 26, the microprocessor 22 transmits the address data to a display unit 42.

The reproduced digital data reset in the form of an analog signal by the D/A converter 38 is subjected to the necessary error correction and memory interleaving and used to drive loudspeaker 44.

Figures 3, 4:
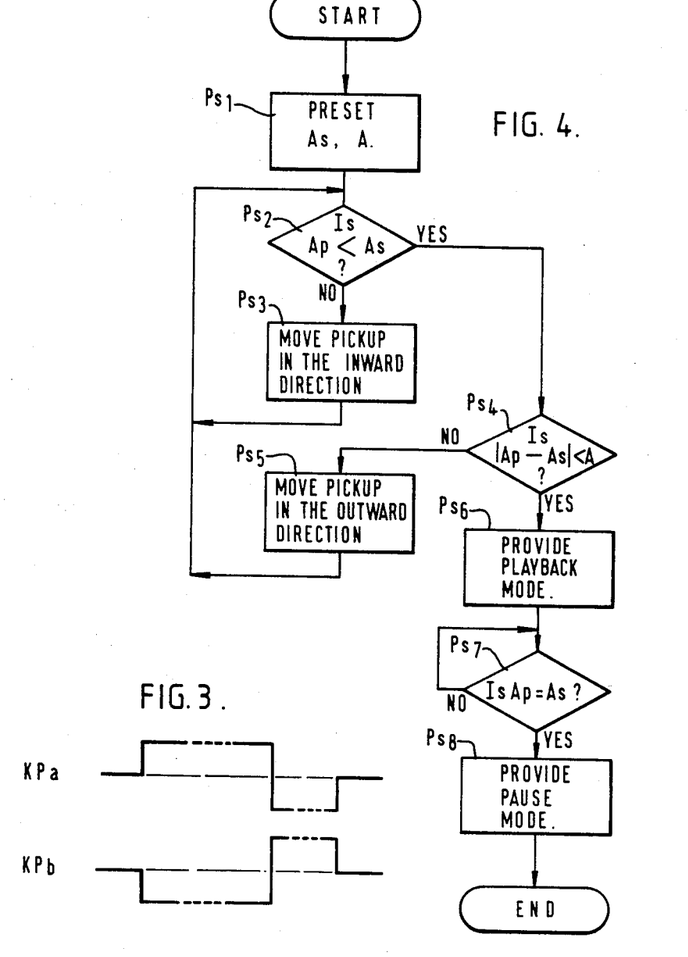
FIG. 3 is a diagram showing kick pulses for use in moving the pickup assembly.
FIG. 4 is a flowchart illustrating a process of the record disc reproducing apparatus of FIG. 2.

The microprocessor 22 is driven by a prescribed operation program stored in a ROM (Read Only Memory) 46. For instance, when the fast-forward operation key 16 is operated with the operation program of the ROM 46, the microprocessor 22 generates a three state kick pulse KPa consisting of positive and negative pulses at the beginning and end portions thereof as shown in FIG. 3 and sends the kick pulse KPa to a pickup carriage motor 48 from another output port $Pt_3$ thereof. The kick pulse KPa is applied to the pickup carriage motor 48 through an output control circuit 50 which is described in detail later. Accordingly, the pickup 28 is carried in the outward radial direction of the disc 26 at high speed when the positive pulse of the kick pulse KPa is applied through the output control circuit 50, and then the energizing force for the pickup 28 is attenuated when the negative pulse of the kick pulse KPa is applied. As a result, the laser beam of pickup 28 is made to move at high speed in the outward radial direction of the disc 26 whenever the kick pulse KPa is applied and the record disc reproducing system 10 is caused to carry out the fast-forward operation.

When the fast-reverse operation key 18 is operated, the microprocessor 22 supplies another three state kick pulse KPb consisting of negative and positive pulse portions at the beginning and end thereof as shown in FIG. 3 in reverse order from the kick pulse KPa. The pulse KPb is supplied from the output port $Pt_3$ to the pickup carriage motor 48 through the output control circuit 50. As a result, the laser beam of the pickup 28 is moved to radially inward on the disc 26 whenever the kick pulse KPb is supplied, so that the record disc reproducing system 10 carries out the fast-reverse operation.

Moreover, when the stop operation key 14 is operated, the microprocessor 22 stops the pickup carriage motor 48 and movement of the pickup 28 by a stop signal generated from an output port $Pt_4$ of the microprocessor 22. The microprocessor 22 also stops the disc drive motor 24, and the rotation of the disc 26 is stopped thus allowing for attaching and detaching the disc 26 from the apparatus.

When the playback operation key 12 is operated, the microprocessor 22 first places the record disc reproducing system 10 in a playback mode and presets the reference address generator 52 connected to output port $Pt_5$ with an address obtainable by the address detector 36 (hereinafter called a reproduction address Ap). The reference address generator 52 is conventionally composed of a presettable counter and an oscillator to generate a reference address Ar which is equivalent to the reproduction address Ap, but which is generated independently of the reproduction address Ap after the preset of the reference address generator 52. The reference address Ar generated from the reference address generator 52 is applied to one of the inputs of an address comparator 54 composed of a conventional digital comparator, while the reproduction address Ap from the address detector 36 is applied to another input of the address comparator 54.

The address comparator 54 compares the reproduction address Ap from the address detector 36 with the reference address Ar from the reference address generator 52 and then generates a compared result signal $S_{CR}$ varying in correspondence with the difference between the reproduction address Ap and the reference address Ar. The compared result signal $S_{CR}$ is applied to another input port $Pt_6$ of the microprocessor 22. The microprocessor 22 generates at the output port $Pt_3$ the kick pulse KPa or KPb in accordance with the polarity of the compared result signal applied to the input port $Pt_6$. That is, the address comparator 54 produces a positive signal $S_{CR}$ when the reproduction address Ap from the address detector 36 is smaller than the reference address Ar from the reference address generator 52, and the address comparator 54 produces a negative signal $S_{CR}$ when the reproduction address Ap is larger than the reference address Ar. Then the microprocessor 22 generates the kick pulse KPa or KPb in accordance with whether the positive or the negative compared result signal $S_{CR}$ is present.

The kick pulse KPa or KPb generated in the playback operation has a pulse width shorter than that generated in the search operation. The output control circuit 50 distinguishes the pulse width of the kick pulse KPa or KPb, whether longer or shorter than the prescribed value, and delivers the kick pulse KPa or KPb to the pickup carriage motor 48 or the pickup 28 accordingly. Thus, the kick pulse KPa or KPb generated in the search operation and having relatively long pulse width is applied to the pickup carriage motor 48 by the output control circuit 50. When the kick pulse KPa or KPb generated in the playback operation has a relatively short pulse width, it is applied to the pickup 28 by output control circuit 50. The positive or negative pulse at the beginning portion of the kick pulse KPa or KPb applied to the pickup 28 drives a tracking actuator (not shown) in the pickup 28 so that the laser beam moves in an outward or inward radial direction of the disc 26 for the pulse width of the positive or negative forepart pulse portion. During the application of the beginning portion of the kick pulse KPa or KPb to the tracking actuator, the servo-circuit 32 drives the pickup carriage motor 48 in an outward or inward direction of the disc 26 according to the tracking error signal caused by the movement of the tracking actuator so as to compensate for tracking error.

The end portion of the kick pulse KPa or KPb is set to have a pulse width of half of the beginning portion by the microprocessor 22 so that it drives the tracking actuator to the correct location without overdriving the tracking actuator in the opposite direction.

Further, the kick pulse KPa or KPb width is controlled in accordance with the compared result signal $S_{CR}$. In other words, the pulse width is determined by the difference between the reproduction address Ap and the reference address Ar. When the difference between the reproduction address Ap and reference address Ar corresponds to an address value indicating one, two or three tracks divergence, the microprocessor 22 generates the kick pulse KPa or KPb with one, two or three unit length's pulse width. Therefore the pickup 28 jumps to a different track of disc 26 from the track being traced by one, two or three tracks, according to the respective pulse width of the kick pulse KPa or KPb.

Figure 5:
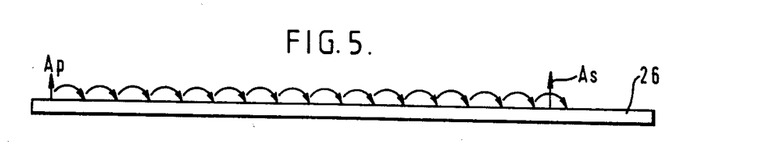
FIG. 5 is a diagram showing a typical search made by a conventional record disc reproducing apparatus.

Referring now to FIGS. 4 and 5, a search function according to one embodiment of the present invention will be described. The search function mode is set by an operation of the search operation key 20 after a prior designation or preset of a suitable code or number corresponding to the desired program location to be located. The preset of a code is performed by designating the code of the desired program to a preset unit (not shown) connected to the microprocessor 22. The designated code is stored in the RAM 40 after being processed by the microprocessor 22. When the search operation key 20 is operated, the microprocessor 22 reads out a prescribed address As of the TOC data previously stored in the RAM 10 (hereinafter referred as a TOC address), where the prescribed address As corresponds to the code of the desired program. This step is shown by process $Ps_1$ in FIG. 4.

Next, the microprocessor 22 checks whether the reproduction address Ap presently reproduced and applied to the input port $Pt_3$ is smaller than the TOC address As, as shown by process $Ps_2$. If it is not, i.e. the pickup 28 is located radially outward from the location of the desired program, the NO path is followed. Thus the microprocessor 22 moves the pickup inward by producing the kick pulse KPb (see FIG. 3) from output port $Pt_3$. Kick pulse KPb is applied to the pickup carriage motor 48 through the output control circuit 50 to cause the pickup assembly 28 to move at high speed radially inward on the disc 26. It moves a prescribed distance determined by the pulse width T/2 (T will be described in detail below) of the kick pulse KPb. This entire step is process Ps$_3$ shown in FIG. 4. Then the microprocessor 22 again carries out process Ps$_2$.

In the case that Ap<As, (process ps$_1$) i.e. the pickup 28 is located radially inward from the location of the desired program the YES path is followed. The microprocessor 22 finds a difference between the TOC address As and the reproduction address Ap and checks whether the absolute value of the difference is smaller than a prescribed value A as shown in process Ps$_4$. The prescribed value A has been previously set in the microprocessor 22 and is the acceptable tolerance for the search function. If the result of process Ps$_4$ is NO, the microprocessor 22 moves the pickup outwardly by producing the kick pulse KPa (see FIG. 3) from output port Pt$_3$. Kick pulse KPa is applied to the pickup carriage motor 48 through the output control circuit 50 to cause the pickup assembly 28 to move at high speed radially outward. The movement is made a prescribed distance determined by the pulse width T of the kick pulse KPa . This entire procedure is shown by process Ps$_5$. Then, the microprocessor 22 again carries out process Ps$_2$.

If the result of process Ps$_4$ is YES, the microprocessor 22 brings the disc reproducing system 10 to the playback operation state as shown by process Ps$_6$. The playback operation is maintained until the microprocessor detects the reproduction address Ap being equivalent to the TOC address As as shown by the process Ps$_7$. When equality of the addresses is detected in process Ps$_7$, the microprocessor 22 brings the disc reproducing system 10 to a pause mode shown by process Ps$_8$. Thus the search operation according to this embodiment of the present invention is performed.

The pulse width T of kick pulse KPa is set in the microprocessor 22 so that the pickup 28 is moved by a distance of, for example, one-sixteen (1/16) of the program area of the disc 26 according to the one kick pulse KPa as shown in FIG. 3. Meanwhile the kick pulse KPb with the pulse width T/2 makes the pickup 28 move by a half of the distance.

In the above embodiment, there are required many steps for searching a desired program if the desired program is very far from the search starting point as is easily understood from FIG. 5.

Figure 6:
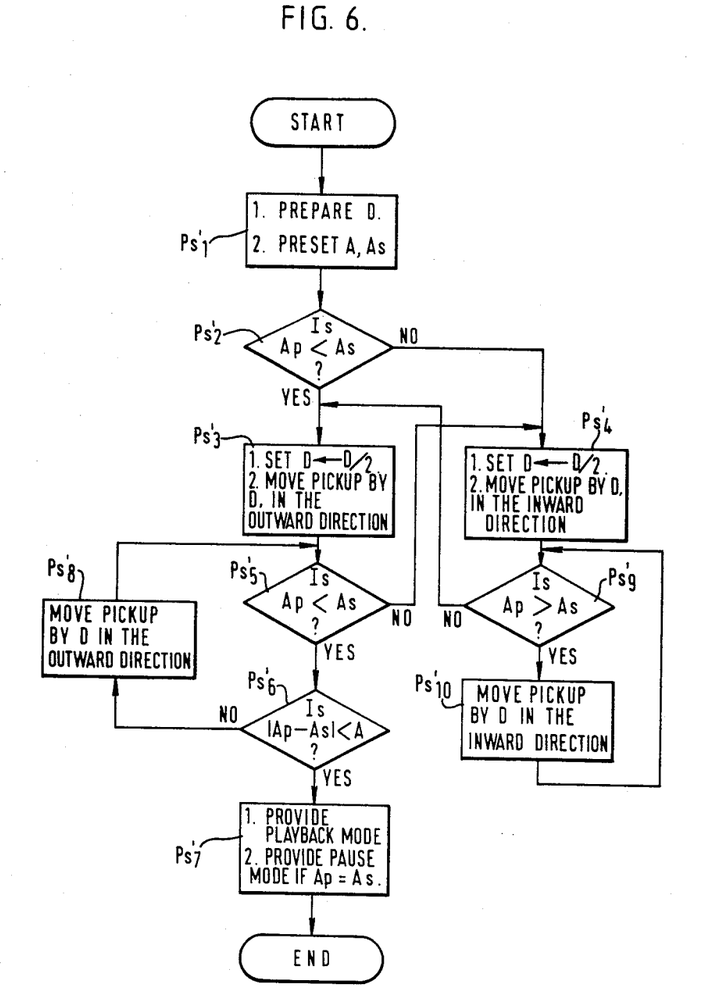
FIG. 6 is a flowchart illustrating another embodiment of the record disc reproducing apparatus in accordance with the present invention.

Referring now to FIG. 6, a search function according to another embodiment of the present invention will be described. The search function mode is also set by the operation of the search operation key 20 and the prior designation or preset of a suitable code or number corresponding to a desired program location to be searched. Initially the distance (D), which is the distance the pickup 28 is to be moved, is selected. When the search operation key 20 is operated, the microprocessor 22 carries out process Ps$_1$'. The microprocessor 22 sets a data distance (D) which is the distance between the search starting point and the location of the desired program. Then, the microprocessor 22 carries out process Ps$_2$'. In the process Ps$_2$', the microprocessor 22 checks whether the reproduction address Ap reproduced by the pickup 28 at the starting point and applied to the input port Pt$_3$ of the microprocessor 22 is smaller than the TOC address As of the desired program location. The result of the process Ps$_2$', YES or NO, means that the pickup 28 is located inwardly of or outwardly of the location of the desired program on the disc, respectively. When the result is YES, the microprocessor 22 carries out process Ps$_3$', otherwise the microprocessor carries out process Ps$_4$'.

In the process Ps$_3$', the microprocessor 22 replaces D with D/2 and moves the pickup outward. Again, this involves applying the kick pulse KPa to the pickup carriage motor 48 to make the pickup assembly 28 move at high speed in a radially outward direction of the disc 26 by a distance in accord with the newly set variable D.

In the process ps$_4$', the microprocessor 22 also replaces D with D/2 and moves the pickup inwardly by applying the kick pulse KPb to the pickup carriage motor 48 to cause the pickup assembly 28 to move at high speed toward the center of the disc 26 by a distance according to the newly set variable.

Where a pulse width T of the kick pulse KPa or KPb is selected from various pulse widths prepared in the microprocessor 22 and stored in the ROM 46 in a form of a table as described below the pickup carriage motor 48 moves the pickup 28 at a high speed to a position determined by variable D. That is, the pulse width T of the kick pulse KPa or KPb is selected from, for example, the following table;

| Pulse Width T | Track Numbers Moved | Program Time (sec.) |
|---|---|---|
| T$_1$ | 1 | 0.12–0.33 |
| T$_2$ | 3 | 0.4–1 |
| T$_3$ | 5 | 0.6–1.7 |
| T$_4$ | 7 | 1–2.3 |
| T$_5$ | 15 | 2–5 |
| T$_6$ | 31 | 4–11 |
| T$_7$ | 64 | 8–21 |
| T$_8$ | 128 | 16–43 |
| T$_9$ | 256 | 32–85 |

The lower limit of the Program Time in the Table are those times for the most inside portion of the program area, while upper limit figures are those for the portion of the program area the farthest radially outward from the center of the disc. The microprocessor 22 selects a suitable pulse width T and applies the kick pulse KPa or KPb with the pulse width T to the pickup carriage motor 48 to cause the pickup 28 to move the distance corresponding to the data set in accord with the variable D. When the pickup 28 is very far from the desired program portion, i.e. the variable D is set very large, the microprocessor 22 applies the kick pulse KPa or KPb with the pulse width T$_9$ several times to the pickup carriage motor 48.

The microprocessor 22 carries out process Ps$_5$' following process Ps$_3$'. In the process Ps$_5$', the microprocessor 22 again checks whether the reproduction address Ap newly reproduced is smaller than the TOC address As. The result of the process Ps$_2$', YES or NO, also means that the pickup 28 is located on the inward side or the outward side of the location of the desired program. In case the result is YES, the microprocessor 22 carries out process Ps$_6$', otherwise the microprocessor goes to the aforementioned process Ps$_4$'.

In the process Ps$_6$', the microprocessor 22 finds a difference between the TOC address As and the reproduction address Ap and checks whether the absolute value of the difference is smaller than the prescribed value A previously set in the microprocessor 22. The result of process Ps$_6$', YES or NO, means that the pickup 28 is either sufficiently near to the desired program or still too far from it. If the result of process Ps$_6$' is YES, the microprocessor 22 carries out process Ps$_7$', otherwise the microprocessor 22 carries out process Ps$_8$'. In the process Ps$_7$', the microprocessor 22 places the disc reproducing system 10 in the playback operation mode and then in the pause mode when the reproduction address Ap is equivalnet to the TOC address in the playback operation. In the process $Ps_8'$, the microprocessor 22 again applies the kick pulse KPa to the pickup carriage motor 48 to make the pickup assembly 28 move at high speed radially outward of the disc 26 by the same distance set in process $Ps_3'$. After process $Ps_8'$, the microprocessor 22 returns to process $Ps_5'$.

The microprocessor 22 carries out process $Ps_9'$ after process $Ps_4'$. In the process $Ps_9'$, the microprocessor 22 checks whether the reproduction address Ap newly reproduced is larger than the TOC address As. The result in process $Ps_9$, YES or NO, also means that the pickup 28 is located outward from or inward from the location of the desired program. When the result is YES, the microprocessor 22 goes to process $Ps_{10}'$ and then returns to process $Ps_9'$ again. Otherwise the microprocessor 22 returns to the aforementioned process $Ps_3'$. In the process $Ps_{10}'$, the microprocessor 22 again applies the kick pulse KPb to the pickup carriage motor 48 to make the pickup assembly 28 move at high speed inwardly by the same distance set in process $Ps_4'$.

Figure 7:
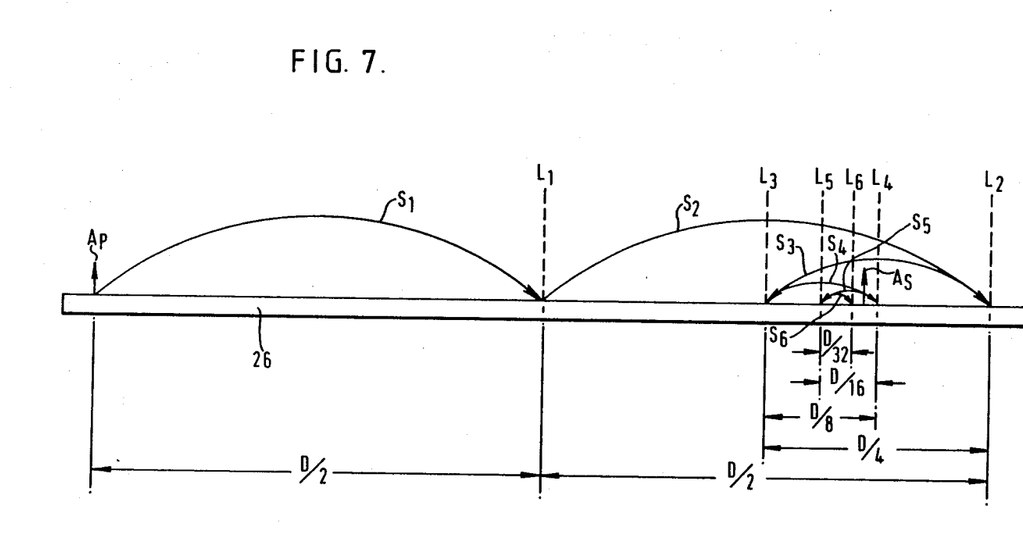
FIG. 7 is a diagram showing a typical search made by the record disc reproducing apparatus of FIG. 2.

Referring now to FIGS. 6 and 7, there will be described one example of the search operation for a desired program. In this example, it is assumed that the desired program is located on the position shown by As and the pickup 28 is originally located on the position shown by Ap in FIG. 7.

When the search operation has started, the microprocessor 22 carries out process $Ps_1'$. In the process $Ps_1'$, the microprocessor 22 sets D to about the distance between the search starting point Ap and the location As of the desired program. Then, the microprocessor 22 carries out process $Ps_2'$. After process $Ps_2$, the microprocessor 22 goes to process $Ps_3'$ because the reproduced address Ap at the search operation starting position is smaller than the TOC address As of the desired program. The microprocessor 22 thus makes the pickup 28 move by a distance D/2 as shown in step $S_1$ in the FIG. 7 according to process $Ps_3'$.

The pickup 28 having been moved to location $L_1$ as shown in FIG. 7, the microprocessor 22 carries out process $Ps_5'$ to check whether the new reproduction address Ap detected by the pickup 28 at the location $L_1$ is smaller than the TOC address As of the desired program location. Because the reproduction address Ap at location $L_1$ is smaller than the TOC address As, the microprocessor 22 goes to process $Ps_6'$ to check whether the difference between the TOC address As and the reproduction address Ap at the location $L_1$ is smaller than the prescribed value A previously set in the microprocessor 22. Because the difference is larger than the prescribed value, the microprocessor 22 goes on to process $Ps_8'$. According to process $Ps_8'$, the microprocessor 22 causes pickup 28 to move a distance D/2 outward from the center of the disc 26 as shown by step $S_2$ in FIG. 7.

After the pickup 28 is moved to location $L_2$ as shown in FIG. 7, the microprocessor 22 again carries out the process $Ps_5'$ to check whether the reproduction address Ap newly reproduced by the pickup 28 at location $L_2$ is smaller than the TOC address As of the desired program location. Because the reproduction address Ap at location $L_2$ is larger than the TOC address As, the microprocessor 22 goes to process $Ps_4'$. According to process $Ps_4'$, the microprocessor 22 makes the pickup 28 move by the distance D/4 inwardly of the disc 26 as shown by step $S_3$ in FIG. 7.

At the location $L_3$ after pickup 28 is moved to location $L_3$, the microprocessor 22 carries out the process $Ps_9'$ to check whether the new reproduction address Ap detected by pickup 28 at location $L_3$ is larger than the TOC address As of the desired program location. Because the reproduction address Ap at location $L_3$ is smaller than the TOC address As, the microprocessor 22 goes to process $Ps_3'$. The microprocessor 22 thus makes the pickup 28 move by a distance D/8 as shown in step $S_4$ in the FIG. 7 according to process $Ps_3'$.

The pickup 28 is then moved to location $L_4$ as shown in FIG. 7. The microprocessor 22 carries out the process $Ps_5'$ to check whether the new reproduction address Ap detected by the pickup 28 at location $L_4$ is smaller than the TOC address As of the desired program location. Because the reproduction address Ap at location $L_4$ is larger than the TOC address As, the microprocessor 22 again goes to process $Ps_4'$. According to process $Ps_4'$, the microprocessor 22 makes the pickup 28 move by the distance D/16 in the inward direction of the disc 26 as shown by step $S_5$ in FIG. 7.

The pickup 28 is then moved to location $L_5$. The microprocessor 22 carries out process $Ps_9'$ to check whether the new reproduction address Ap detected by the pickup 28 at location $L_5$ is larger than the TOC address As of the desired program location. Because the reproduction address Ap at location $L_5$ is smaller than the TOC address As, the microprocessor 22 again goes to process $Ps_3'$. The microprocessor 22 thus causes the pickup 28 to move by a distance D/32 as shown by step $S_6$ in FIG. 7.

After the pickup 28 is moved to location $L_6$ as shown in FIG. 7, the microprocessor 22 carries out process $Ps_5'$ to check whether the new reproduction address Ap reproduced by pickup 28 at location $L_6$ is smaller than the TOC address As of the desired program location. Because the reproduction address Ap at location $L_6$ being smaller than the TOC address As, the microprocessor goes to process $Ps_6'$ to check whether the difference between the TOC address As and the reproduction address Ap at location $L_6$ is smaller than the prescribed value A previously set in the microprocessor 22.

Here it is assumed that the microprocessor 22 has detected that the difference is smaller than the prescribed value. Therefore, the microprocessor 22 goes to process $Ps_7'$. In process $Ps_7'$, the microprocessor 22 places the disc reproducing system 10 in the playback operation mode and then in the pause mode (in which the pickup carriage motor 48 is stopped) to complete the series of search operations. At this time the reproduction address Ap is equivalent to the TOC address in the playback operation.

Thus the record disc reproducing apparatus in accordance with the second embodiment of the present invention is capable of making a search operation for a desired program by reducing the number of search steps and consequently the length of time required for the search operation.

In the second embodiment, the kick pulse KPa or KPb is applied to the actuator coil of the pickup 28 through the output control circuit 50, when the distance between the pickup 28 and the desired program location, i.e. the difference between the new reproduction address Ap and the TOC address As decreases below to the prescribed value.

Referring again to FIGS. 6 and 7, the second embodiment of the present invention can be modified as follows. At the beginning of the search operation the pickup 28 is necessarily located on the innermost track of the program area of the disc 26, according to the prescribed operation program in the microprocessor 22. Accordingly, the process Ps$_2$' of FIG. 6 may be eliminated because the reproduction address Ap at the innermost track of the program area is always smaller than the TOC address As of the desired program. Further, as the dimensions of the program areas are provided in the CD format, the distance D/2 the pickup 28 is to moved according to process Ps$_3$ can always be fixed to a predetermined value, that is, to the value of the center of the program area. Thus process Ps$_1$' of FIG. 6 becomes superfluous and the other processes Ps$_3$', Ps$_4$', Ps$_8$' and Ps$_{10}$' become simpler.

Although the total moving distance necessary for the search operation according to the second embodiment or the modification thereof is greater than that according to the first embodiment, there is little difference in the pickup moving time between the above two embodiments. This is because the enertia of the pickup prevents its moving speed from being increased significantly when the moving distance is short.

In the embodiments of this invention, the kick pulses KPa and KPb may always be applied to the actuator coil of the pickup 28 directly, instead being applied to the pickup carriage motor 48. Thus the output control circuit 50 would not be necessary. The pickup carriage motor 48 may also carry the pickup 28 at high speed through the servo function of the servo-circuit 32 (see FIG. 2).

It is to be understood that the form of the invention herein shown and described is to be taken as a preferred example of the same and that various changes in the shapes and arrangement of parts may be resorted to without departing from the spirit of the invention.

As above described, the present invention is intended to successfully offer a superior record disc reproducing apparatus capable of making a search at the highest possible speed with improved operability.

What is claimed is:

1. An apparatus for accessing data stored on a disc at a preselected data address comprising:
   a pickup assembly for reading from said disc a current data address, said pickup assembly being moveable in a radial direction with respect to said disc;
   means for moving said pickup assembly; and
   processing means including:
      means for determining the difference between said current data address and said preselected data address, and
      means for causing said moving means to move said pickup assembly a calculated distance in a direction to reduce the magnitude of said difference, as long as the magnitude of said difference is greater than a given prescribed address tolerance value, and for reducing said calculated distance each time the difference of the magnitudes of said given preselected data address and said current data address changes.

2. The record disc reproducing apparatus according to claim 1 wherein said processing means includes means for reducing said calculated distance by one-half when said relationship of the magnitudes of said current data address and said preselected data address changes.

3. A method of moving a pickup assembly to a preselected data address of a record disc comprising the steps of:
   reading a current data address indicating the current position of said pickup assembly in relationship to said disc;
   comparing said current data address to said preselected data address;
   moving the pickup assembly by a given amount in one direction if the magnitude of said current address bears a predetermined relationship with the magnitude of said desired address;
   moving said pickup assembly in a second direction, opposite to said first direction, if the magnitude of said current address does not bear said predetermined relationship with the magnitude of said preselected data address and if the magnitude of the difference between said current data address and said preselected data address is less than a prescribed address tolerance value.

4. The method of claim 3 wherein said steps of moving said pickup assembly occur at a first speed, and
   wherein said method further includes the step of changing the speed of movement of said pickup assembly to a lower speed if the difference between said preselected address and said desired address is less than said prescribed address tolerance value.

5. A method for moving a pickup assembly to a preselected data address of a record disc comprising the steps of:
   reading a current data address indicating the current position of said pickup assembly in relation to said disc;
   continuing to move said pickup in a first direction by a calculated distance as long as said current data address bears a predetermined relationship with said preselected data address;
   reducing said calculated distance when said current data address no longer bears said predetermined relationship with said preselected data address; and
   moving said pickup assembly in a second direction by said reduced calculated distance as long as said current data address and said preselected data address do not bear said predetermined relationship and as long as the magnitude of the difference between said current data address and said preselected data address is less than a prescribed address tolerance value.

6. The method according to claim 5 wherein said moving steps take place at a first speed and wherein said method further comprises the step of
   changing pickup assembly movement speed when the magnitude of the difference between said preselected and current data addresses is less than said prescribed address tolerance value.

7. An apparatus for accessing data stored on a disc at a preselected data address comprising:
   a pickup assembly for reading from said disc a current data address, said pickup means being movable in a radial direction with respect to said disc;
   means for moving said pickup assembly; and
   processing means including:
      means for determining the difference between said current data address and said preselected data address, and
      movement command means for causing said moving means to move said pickup assembly a given distance in a direction determined so as to reduce said difference, as long as the magnitude of said difference is larger than a prescribed address tolerance value including first means for causing said moving means to move said pickup assembly in a first radial direction said given distance when the magnitudes of said current data address and said preselected data address have a first relationship, and second means for causing said moving means to move said pickup assembly in a second radial direction at a distance less than said given distance when the magnitude of said current data address and said preselected data address have a second relationship opposite to said first relationship.

8. The record disc reproducing apparatus according to claim 7 wherein the initial value for said calculated distance is approximately half of the radial distance between locations on said disc of an initial current data address and said preselected data address.

9. The record disc reproducing apparatus according to claim 7, wherein said disc includes at least one program area with a radial breadth and wherein the initial value for said calculated distance is approximately half said radial breadth of a program area of the disc.

* * * * *